US011877140B2

(12) United States Patent
Seefeldt et al.

(10) Patent No.: US 11,877,140 B2
(45) **Date of Patent: *Jan. 16, 2024**

(54) PROCESSING OBJECT-BASED AUDIO SIGNALS

(71) Applicant: Dolby Laboratories Licensing Corporation, San Francisco, CA (US)

(72) Inventors: Alan J. Seefeldt, Alameda, CA (US); Lie Lu, Dublin, CA (US); Chen Zhang, Beijing (CN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,103

(22) Filed: Oct. 10, 2022

(65) Prior Publication Data

US 2023/0105114 A1 Apr. 6, 2023

Related U.S. Application Data

(60) Continuation of application No. 16/825,776, filed on Mar. 20, 2020, now Pat. No. 11,470,437, which is a (Continued)

(30) Foreign Application Priority Data

Jun. 1, 2015 (CN) ......................... 201510294063.7

(51) Int. Cl.

| | |
|---|---|
| ***H04S 7/00*** | (2006.01) |
| ***H04S 3/00*** | (2006.01) |
| *G10L 19/008* | (2013.01) |

(52) U.S. Cl.
CPC .............. *H04S 7/302* (2013.01); *H04S 3/008* (2013.01); *H04S 7/30* (2013.01); *G10L 19/008* (2013.01); *H04S 2400/11* (2013.01)

(58) Field of Classification Search
None
See application file for complete search history.

(56) References Cited

U.S. PATENT DOCUMENTS 4,086,433 A * 4/1978 Gerzon ..................... H04S 3/02 381/21
5,757,927 A * 5/1998 Gerzon ..................... H04S 3/02 381/20

(Continued)

FOREIGN PATENT DOCUMENTS

WO 2013006330 1/2013
WO 2014160678 10/2014

(Continued)

*Primary Examiner* — Duc Nguyen
*Assistant Examiner* — Assad Mohammed

(57) ABSTRACT

An audio processing system and method which calculates, based on spatial metadata of the audio object, a panning coefficient for each of the audio objects in relation to each of a plurality of predefined channel coverage zones. Converts the audio signal into submixes in relation to the predefined channel coverage zones based on the calculated panning coefficients and the audio objects. Each of the submixes indicating a sum of components of the plurality of the audio objects in relation to one of the predefined channel coverage zones. Generating a submix gain by applying an audio processing to each of the submix and controls an object gain applied to each of the audio objects. The object gain being as a function of the panning coefficients for each of the audio objects and the submix gains in relation to each of the predefined channel coverage zones.

7 Claims, 3 Drawing Sheets

Related U.S. Application Data division of application No. 16/368,574, filed on Mar. 28, 2019, now Pat. No. 10,602,294, which is a division of application No. 16/143,351, filed on Sep. 26, 2018, now Pat. No. 10,251,010, which is a division of application No. 15/577,510, filed as application No. PCT/US2016/034459 on May 26, 2016, now Pat. No. 10,111,022.

(60) Provisional application No. 62/183,491, filed on Jun. 23, 2015.

(56) References Cited

U.S. PATENT DOCUMENTS

| | | | | |
|---|---|---|---|---|
| 7,672,744 | B2 | 3/2010 | Oh | |
| 8,139,773 | B2 | 3/2012 | Oh | |
| 8,204,756 | B2 | 6/2012 | Kim et al. | |
| 8,254,600 | B2 | 8/2012 | Oh | |
| 8,295,494 | B2 | 10/2012 | Oh et al. | |
| 8,315,396 | B2 | 11/2012 | Schreiner | |
| 8,364,497 | B2 * | 1/2013 | Beack | G10L 19/20 381/2 |
| 8,639,368 | B2 | 1/2014 | Oh | |
| 8,670,575 | B2 | 3/2014 | Oh | |
| 8,712,784 | B2 | 4/2014 | Seo | |
| 9,761,229 | B2 * | 9/2017 | Xiang | G10L 19/008 |
| 9,883,311 | B2 | 1/2018 | Breebaart | |
| 10,021,504 | B2 | 7/2018 | Chon | |
| 2011/0166867 | A1 | 7/2011 | Seo | |
| 2012/0170756 | A1 | 7/2012 | Kraemer | |
| 2012/0177204 | A1 | 7/2012 | Hellmuth | |
| 2012/0263308 | A1 | 10/2012 | Herre | |
| 2012/0269353 | A1 * | 10/2012 | Herre | G10L 19/20 704/500 |
| 2012/0314875 | A1 | 12/2012 | Lee | |
| 2013/0010969 | A1 | 1/2013 | Cho | |
| 2014/0025386 | A1 | 1/2014 | Xiang | |
| 2014/0297296 | A1 | 10/2014 | Koppens | |
| 2014/0355771 | A1 | 12/2014 | Peters | |
| 2015/0016641 | A1 | 1/2015 | Ugur | |
| 2015/0170657 | A1 * | 6/2015 | Thompson | G10L 19/008 704/500 |
| 2015/0194158 | A1 | 7/2015 | Oh | |
| 2015/0223002 | A1 | 8/2015 | Mehta | |
| 2015/0350802 | A1 | 12/2015 | Jo et al. | |
| 2016/0029140 | A1 | 1/2016 | Mehta | |
| 2016/0078879 | A1 | 3/2016 | Lu et al. | |
| 2016/0080886 | A1 * | 3/2016 | De Bruijn | H04S 7/308 381/17 |
| 2016/0104491 | A1 * | 4/2016 | Lee | G10L 19/008 381/22 |
| 2016/0134989 | A1 | 5/2016 | Herre | |
| 2016/0142844 | A1 | 5/2016 | Breebaart et al. | |
| 2016/0299738 | A1 | 10/2016 | Makinen et al. | |
| 2016/0316309 | A1 | 10/2016 | Borss et al. | |
| 2016/0330560 | A1 | 11/2016 | Chon et al. | |
| 2017/0011751 | A1 | 1/2017 | Fueg et al. | |
| 2017/0048640 | A1 | 2/2017 | Dressler | |
| 2017/0309288 | A1 | 10/2017 | Koppens et al. | |
| 2018/0077511 | A1 | 3/2018 | Mehta | |
| 2018/0091926 | A1 | 3/2018 | Cho et al. | |
| 2018/0174594 | A1 | 6/2018 | Kim | |

FOREIGN PATENT DOCUMENTS

| | | |
|---|---|---|
| WO | 2014184353 | 11/2014 |
| WO | 2015010961 | 1/2015 |
| WO | 2015010999 | 1/2015 |
| WO | 2015011015 | 1/2015 |

* cited by examiner

PROCESSING OBJECT-BASED AUDIO SIGNALS

CROSS-REFERENCE TO RELATED APPLICATIONS

This application is a continuation of U.S. patent application Ser. No. 16/825,776, filed Mar. 20, 2020 which is a divisional of U.S. patent application Ser. No. 16/368,574, filed on Mar. 28, 2019 (now issued as U.S. Pat. No. 10,602,294), which is a divisional of U.S. patent application Ser. No. 16/143,351, filed on Sep. 26, 2018 (now issued as U.S. Pat. No. 10,251,010), which is a divisional of U.S. patent application Ser. No. 15/577,510, filed on Nov. 28, 2017 (now issued as U.S. Pat. No. 10,111,022), which is the U.S. national stage of International Patent Application No. PCT/US2016/034459 filed on May 26, 2016, which in turn claims priority to U.S. Provisional Patent Application No. 62/183,491, filed on Jun. 23, 2015 and Chinese Patent Application No. 201510294063.7, filed on Jun. 1, 2015, each of which is hereby incorporated by reference in its entirety.

Technology

Example embodiments disclosed herein generally relate to audio signal processing, and more specifically, to a method and system for processing an object-based audio signal.

BACKGROUND

There are a number of audio processing algorithms modifying audio signals in either temporal domain or spectral domain. Various audio processing algorithms are developed so as to improve overall quality of audio signals and thus enhance users' experience on the playback. By way of example, existing processing algorithms may include a surround virtualizer, a dialog enhancer, a volume leveler, a dynamic equalizer and the like.

The surround virtualizer can be used to render a multi-channel audio signal over a stereo device such as a headphone because it creates a virtual surround effect for the stereo device. The dialog enhancer aims at enhancing dialogs in order to improve the clarity and intelligibility of human voices. The volume leveler aims at modifying an audio signal so as to make the loudness of the audio content more consistent over time, which may lower the output sound level for a very loud object at some time but enhance the output sound level for a whispered object at some other time. The dynamic equalizer provides a way to automatically adjust the equalization gains at each frequency bands in order to keep the overall consistency of the spectral balance with regard to a desired timbre or tone.

Traditionally, existing audio processing algorithms are developed for processing channel-based audio signals such as stereo, 5.1 and 7.1 surround signals. Because a sound field is constructed by a number of endpoints, such as front left, front right, center, surround left, surround right and even height loudspeakers, the sound field can be defined by all of the endpoints. A channel-based audio signal can therefore be spatially rendered in the sound field. The input audio channels are firstly down-mixed into a number of submixes, such as front, center and surround submixes in order to reduce the computational complexity on the subsequent audio processing algorithms. In the context, the sound field can be divided into several coverage zones in relation to endpoint arrangements and the submix represents a sum of components of the audio signal in relation to a particular coverage zone. An audio signal is typically processed and rendered as a channel-based audio signal, meaning that metadata associated with position, velocity, size and the like of an audio object is absent in the audio signal.

Recently, more and more object-based audio contents are created, which may include audio objects and metadata associated with the audio objects. The audio content of this kind provides a better 3D immersive audio experience through more flexible rendering of the audio objects in comparison to the traditional channel-based audio content. At playback time, a rendering algorithm may, for example, render the audio objects to an immersive speaker layout including speakers all around as well as above the listener.

However, by using the typical audio processing algorithms as mentioned above, the object-based audio signals needs to be first rendered as the channel-based audio signals in order to be down-mixed into submixes for audio processing. This means that metadata associated with these object-based audio signals are discarded, and the resulting rendering is thus compromised in terms of playback performance.

In view of the foregoing, there is a need in the art for a solution for processing and rendering the object-based audio signals without discarding their metadata.

SUMMARY

In order to address the foregoing and other potential problems, example embodiments disclosed herein proposes a method and system for processing object-based audio signals.

In one aspect, example embodiments disclosed herein provide a method of processing an audio signal, the audio signal having a plurality of audio objects. The method includes calculating, based on spatial metadata of the audio object, a panning coefficient for each of the audio objects in relation to each of a plurality of predefined channel coverage zones, and converting the audio signal into submixes in relation to all of the predefined channel coverage zones based on the calculated panning coefficients and the audio objects. The predefined channel coverage zones are defined by a plurality of endpoints distributed in a sound field. Each of the submixes indicates a sum of components of the plurality of the audio objects in relation to one of the predefined channel coverage zones. The method also includes generating a submix gain by applying an audio processing to each of the submixes, and controlling an object gain applied to each of the audio objects, the object gain being as a function of the panning coefficients for each of the audio objects and the submix gains in relation to each of the predefined channel coverage zones.

In another aspect, example embodiments disclosed herein provide a system for processing an audio signal, the audio signal having a plurality of audio objects. The system includes a panning coefficient calculating unit configured to calculate a panning coefficient for each of the audio objects in relation to each of a plurality of predefined channel coverage zones based on spatial metadata of the audio object, and a submix converting unit configured to convert the audio signal into submixes in relation to all of the predefined channel coverage zones based on the calculated panning coefficients and the audio objects. The predefined channel coverage zones are defined by a plurality of endpoints distributed in a sound field. Each of the submixes indicates a sum of components of the plurality of the audio objects in relation to one of the predefined channel coverage zones. The system also includes a submix gain generating unit configured to generate a submix gain by applying an audio processing to each of the submixes, and an object gain controlling unit configured to control an object gain applied to each of the audio objects, the object gain being as a function of the panning coefficients for each of the audio objects and the submix gains in relation to each of the predefined channel coverage zones.

Through the following description, it would be appreciated that in accordance with example embodiments disclosed herein, object-based audio signals can be rendered by taking account of the associated metadata. Because metadata from the original audio signal is preserved and used when rendering all of the audio objects, the audio signal processing and rendering can be carried out more accurately and thus the resulting reproduction is more immersive when played by, for example, a home theatre system. Meanwhile, with the submixing process described herein, the object-based audio signal can be converted into a number of submixes which can be processed by conventional audio processing algorithms, which is advantageous because the existing processing algorithms are all applicable in object-based audio processing. The generated panning coefficients, on the other hand, are useful to yield object gains for weighing all of the original audio objects. Because the number of objects in an object-based audio signal is normally much more than the number of channels in a channel-based audio signal, the separate weighting of the objects produces a more accurate processing and rendering of the audio signal compared with conventional methods applying the processed submix gains to the channels. Other advantages achieved by the example embodiments disclosed herein will become apparent through the following descriptions.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Figure 1:
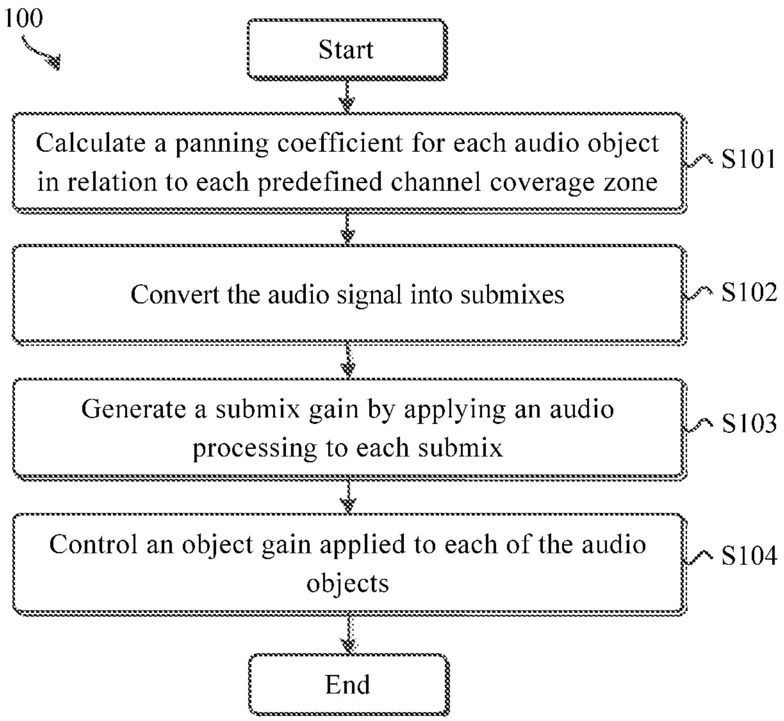
FIG. 1 illustrates a flowchart of a method of processing an object-based audio signal in accordance with an example embodiment.

Principles of the example embodiments disclosed herein will now be described with reference to various example embodiments illustrated in the drawings. It should be appreciated that the depiction of these embodiments is only to enable those skilled in the art to better understand and further implement the example embodiments disclosed herein, not intended for limiting the scope in any manner.

The example embodiments disclosed herein assumes that the audio content or audio signal as input is in an object-based format. It includes one or more audio objects, and each audio object refers to an individual audio element with associated spatial metadata describing properties of the object such as position, velocity, size and so forth. The audio objects may be based on single channel or multiple channels. The audio signal is meant to be reproduced in predefined and fixed speaker locations, which are able to present the audio objects precisely in terms of location and loudness, as perceived by audiences. In addition, the object-based audio signal is easily manipulated or processed for its informative metadata, and it can be tailored to different acoustic systems such as a 7.1 surround home theatre and a headphone. Therefore, the object-based audio signal can provide a more immersive audio experience through more flexible rendering of the audio objects in comparison to traditional channel-based audio signals.

Figure 2:
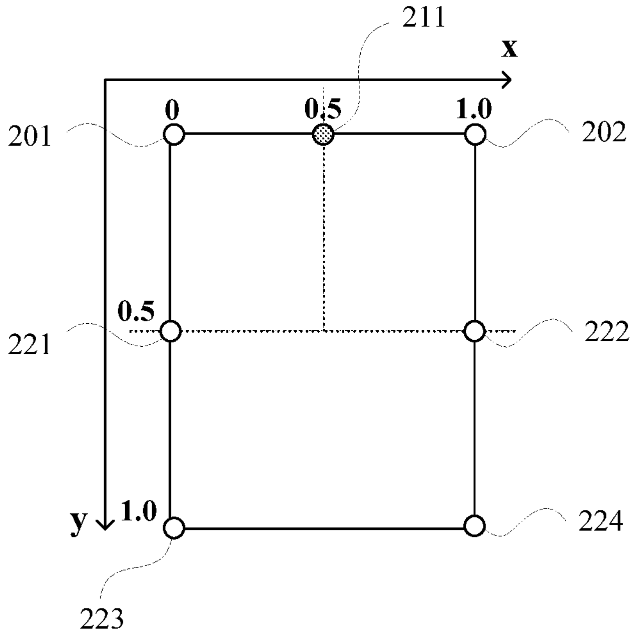
FIG. 2 illustrates an example of predefined channel coverage zones for a typical arrangement of surround endpoints in accordance with an example embodiment.
Figure 3:
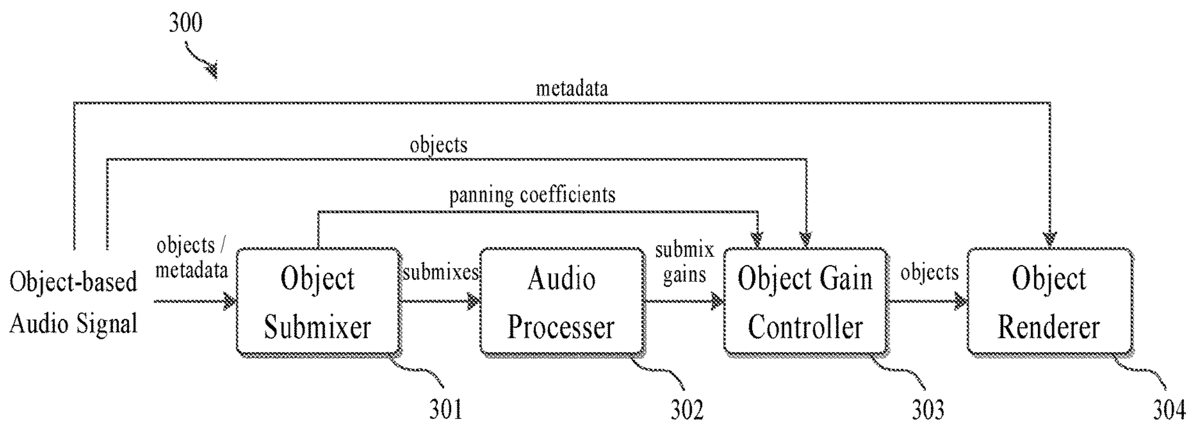
FIG. 3 illustrates a block diagram of an object-based audio signal rendering in accordance with an example embodiment.

FIG. 1 illustrates a flowchart of a method 100 of processing an object-based audio signal in accordance with an example embodiment, while FIG. 3 illustrates an example framework 300 of the object-based audio signal processing and rendering in accordance with the example embodiment. Meanwhile, FIG. 2 illustrates an example of predefined channel coverage zones defined by a typical arrangement of surround endpoints, which shows a typical environment of use for surround content reproduction. An embodiment will be described hereinafter by reference to FIG. 1 through FIG. 3.

In one example embodiment disclosed herein, at step S101, a panning coefficient for each of audio objects in relation to each of predefined channel coverage zones is calculated based on each object's spatial metadata, namely, its position in a sound field relative to endpoints or speakers. In the context, the predefined channel coverage zones may be defined by a number of endpoints distributed in a sound field, so that the position of any of the audio objects in the sound field can be described in relation to the zones. For example, if a particular object is meant to be played at the back side of audiences, its positioning should be highly contributed by the surround zone while less contributed by other zones. The panning coefficient is a weight for describing how close a particular audio object is located relative to each of a number of predefined channel coverage zones. Each of the predefined channel coverage zones may correspond to one submix used to cluster components of the audio objects in relation to each of the predefined channel coverage zones.

FIG. 2 illustrates an example of predefined channel coverage zones distributed in a sound field formed by a number of endpoints or speakers, where a center zone is defined by a center channel 211 (the upper middle circle denoted by 0.5), a front zone is defined by a front left channel 201 and a front right channel 202 (the upper left and upper right circles denoted respectively by 0 and 1.0), and a surround zone is defined by a number of surround channels, for example, two surround left channels 221, 223 (the left and left bottom circles denoted respectively by 0.5 and 1.0) and two surround right channels 222, 224 (the right and right bottom circles denoted respectively by 0.5 and 1.0). An intersection of two dashed lines represent a sweet spot where an audience is recommended to be seated in order to experience the possibly best sound quality and surround effect. However, audiences may take their seats other than the sweet spot and also perceive an immersive reproduction.

It is to be noted that FIG. 2 only shows a sound field in which a particular audio object can be described by x-axis and y-axis in a 2D manner. However, a height zone also can be defined by a height channel. Most of surround systems commercially available are arranged in accordance with FIG. 2, and thus spatial metadata for an audio object may be in the form of [X, Y] or [X, Y, Z] corresponding to the coordinate system in FIG. 2. The panning coefficient can be calculated for each audio object in each submix by Equations (1) to (4) for the center zone, the front zone, the surround zone and the height zone, respectively.

$$\alpha_{ic} = \cos\left(x_i\frac{\pi}{2}\right)\cos\left(y_i\frac{\pi}{2}\right)\cos\left(z_i\frac{\pi}{2}\right) \tag{1}$$

$$\alpha_{if} = \sin\left(x_i\frac{\pi}{2}\right)\cos\left(y_i\frac{\pi}{2}\right)\cos\left(z_i\frac{\pi}{2}\right) \tag{2}$$

$$\alpha_{is} = \sin\left(y_i\frac{\pi}{2}\right)\cos\left(z_i\frac{\pi}{2}\right) \tag{3}$$

$$\alpha_{ih} = \sin\left(z_i\frac{\pi}{2}\right) \tag{4}$$

where α represents the panning coefficient for each zone, i represents the object index, c, f, s, h represent the center, front, surround and height zones, [xi, yl, zl] represents the modified relative position for coefficient calculation derived from the original object position [Xi, Yi, Zj], that is $$x_i = \frac{|X_i - 0.5|}{0.5};\ y_i = \min(2Y_i, 1.0);\ z_i = Z_i \tag{5}$$

It is to be noted that the endpoint arrangement as shown in FIG. 2 and its corresponding coordinate system are illustrative. How the endpoints or speakers are arranged and how the position of the audio object within the sound field is represented are not to be limited. In addition, although the front, center, surround and height zones are illustrated in the example embodiments disclosed herein, it should be appreciated that other ways of zone segmentation are also possible, and the number of the segmented zones is not to be limited.

At step S102, the audio signal is converted into submixes in relation to all of the predefined channel coverage zones based on the panning coefficients calculated at the step S101, as described above, and the audio objects. The step of converting the audio signal into submixes also can be referred to as downmixing. In one example embodiment, the submixes can be generated as a weighted average of each of the audio objects by Equation (6) as below.

$$s_j = \Sigma_{i=1}^{N} \alpha_{ij}\text{object}_i \tag{6}$$

where s represents a submix signal including components of a number of audio objects in relation to the predefined channel coverage zones, j represents one of the four zones c, f, s, h as defined previously, N represents the total number of the audio objects in the object-based audio signal, $\text{object}_i$ represents the signal associated with an audio object i, and $\alpha_{ij}$ represents the panning coefficient for the i-th object in relation to the j-th zone.

In the above embodiment, the submix downmixing process is conducted for each of the zones, in which the panning coefficients are weighted for all of the audio objects. As a result of the panning coefficients, each object may be distributed differently in various zones. For example, a gunshot at the right side of the sound field may have its major component downmixed into the front submix represented by 201 and 202 as shown in FIG. 2, with its minor component(s) downmixed into other submix(es). In other words, one submix indicates a sum of components of multiple audio objects in relation to one predefined channel coverage zone.

In one example embodiment, a front submix may be converted based on panning coefficients for all of the audio objects in relation to the front zone ($\Sigma_{i=1}^{N}\alpha_{if}\text{object}_i$), a center submix may be converted based on panning coefficients for all of the audio objects in relation to the center zone ($\Sigma_{i=1}^{N}\alpha_{ic}\text{object}_i$), a surround submix may be converted based on panning coefficients for all of the audio objects in relation to the surround zone ($\Sigma_{i=1}^{N}\alpha_{is}\text{object}_i$), and a height submix may be converted based on panning coefficients for all of the audio objects in relation to the height zone ($\Sigma_{i=1}^{N}\alpha_{ih}\text{object}_i$).

The generated height submix can provide a higher resolution and a more immersive experience. However, conventional channel-based audio processing algorithms usually only process front (F), center (C), and surround (S) submixes. Therefore, the algorithms may need to be extended to deal with the height (H) submix in parallel to C/F/S processing.

In one example embodiment, the H submix can be processed by using the same method processing the S submix. This requires the least modification on the conventional channel-based audio processing algorithms. It is noted that, although the same method is applied, the obtained panning coefficients on the height submix and surround submix would be still different, since the input signal is different. Alternatively, the H submix can be processed by designing a specific method according to its spatial attribute. For example, a specific loudness model and a masking model may be applied in the H submix for audio processing since it could be quite different comparing with the loudness perception and masking effect of the front or surround submix.

The steps S101 and S102 may be achieved by an object submixer 301 as shown in FIG. 3 which illustrates a framework 300 of the object-based audio signal processing and rendering in accordance with the example embodiment. The input audio signal is an object-based audio signal which contains a number of objects and their corresponding metadata such as spatial metadata. The spatial metadata is used to calculate the panning coefficients in relation to the four predefined channel coverage zones by Equations (1) to (4), and the resulting panning coefficients and the original objects are used to generate submixes by Equation (6). The calculation of the panning coefficients and the generation of submixes may be finished by the object submixer 301.

The object submixer 301 is a key component to leverage the existing channel-based audio processing algorithms that typically downmix the input multichannel audio (e.g., 5.1 or 7.1) into three submixes (F/C/S) in order to reduce computation complexity. Similarly, the object submixer 301 also converts or downmixes the audio objects into submixes based on the objects' spatial metadata, and the submixes can be expanded from existing F/C/S to include additional spatial resolutions, for example, a height submix as discussed above. If metadata on object type is available or automatic classification technology is used to identify types of the audio objects, the submixes can further include other non-spatial attributes such as dialog submix for subsequent dialog enhancement, which will be explained in detail later in the description. With these submixes converted in accordance with the methods and systems herein, the existing channel-based audio processing algorithms can be directly used or slightly modified for object-based audio processing.

At step S103, a submix gain can be generated by applying an audio processing to each of the submixes. This can be achieved by an audio processer 302 as shown in FIG. 3, which receives the submixes from the object submixer 301, and outputs their respective submix gains. As discussed above, the audio processing unit 302 may include the existing channel-based audio processing algorithms including a surround virtualizer, a dialog enhancer, a volume leveler, a dynamic equalizer and the like, because the object-based audio objects and their respective metadata are converted into submixes that the channel-based processing could accept. In this regards, the channel-based audio processing may not be changed and can be used for processing the object-based audio objects as well.

At step S104, an object gain applied to each of the audio objects can be controlled. This can be achieved by an object gain controller 303 as shown in FIG. 3, which is used to apply gains to the original audio objects based on the submix gains and the panning coefficients. After applying audio processing algorithms, as discussed previously, a set of submix gains will be estimated for each submix, indicating how the audio signal should be modified. These submix gains are then applied to the original audio objects, in proportion to each object's contribution to each submix. That is, an object gain for each audio object is related to the submix gain obtained for each submix and the panning coefficient for the audio object in each submix. The object gain may be assigned to each of the audio objects based on the following Equation (7):

$$ObjGain_i = \sqrt{(\alpha_{if} \cdot g_f)^2 + (\alpha_{is} \cdot g_s)^2 + (\alpha_{ic} \cdot g_c)^2 + (\alpha_{ih} \cdot g_h)^2}\ ;\ i = 1 \sim N \quad (7)$$

where $\mathrm{ObjGain}_i$ represents the object gain of the i-th object, $g_f$, $g_s$, $g_c$ and $g_h$ represent the submix gain obtained for the front, surround, center and height submixes, respectively, and $\alpha_{if}$, $\alpha_{is}$, $\alpha_{ic}$ and $\alpha_{ih}$ represent the panning coefficients for the i-th object in relation to the front zone, the surround zone, the center zone and the height zone, respectively.

Because of Equation (7), the position relative to the zones (reflected by $\alpha_{ij}$, j for one of the four zones c, f, s, h) and the desired processing effect (reflected by $g_j$, j for one of the four zones c, f, s, h) are both considered for each of the objects, resulting in an improved accuracy of the audio processing for all the objects.

In one additional example embodiment, the audio signal may be rendered based on the original audio objects, their corresponding metadata, and the object gains. This rendering step may be achieved by an object renderer 304, as shown in FIG. 3. The object renderer 304 may render the processed (object-gain applied) audio objects with various playback devices, which can be discrete channels, soundbars, headphones, and the like. Any existing or potentially available off-the-shelf renderers for object-based audio signals may be applied here, and therefore details in the following will be omitted.

It should be noted that although the object gains for the audio objects are illustrated to be used for an audio rendering process, the object gains may be separately provided without the audio rendering process. For example, a standalone decoding process may yield a number of object gains as its output.

With the submixing process described above, the object-based audio signal can be converted into a number of submixes which can be processed by conventional audio processing algorithms, which is advantageous because the existing processing algorithms are all applicable in object-based audio processing. The generated panning coefficients, on the other hand, are useful to yield object gains for weighing all of the original audio objects. Because the number of objects in an object-based audio signal is normally much more than the number of channels in a channel-based audio signal, the separate weighting of the objects produces an improved accuracy of the audio signal processing and rendering compared with conventional methods applying the processed submix gains to the channels. Further, because metadata from the original audio signal is preserved and used when rendering all of the audio objects, the audio signal may be rendered more accurately and thus the resulting reproduction is more immersive when played by, for example, a home theatre system.

Figure 4:
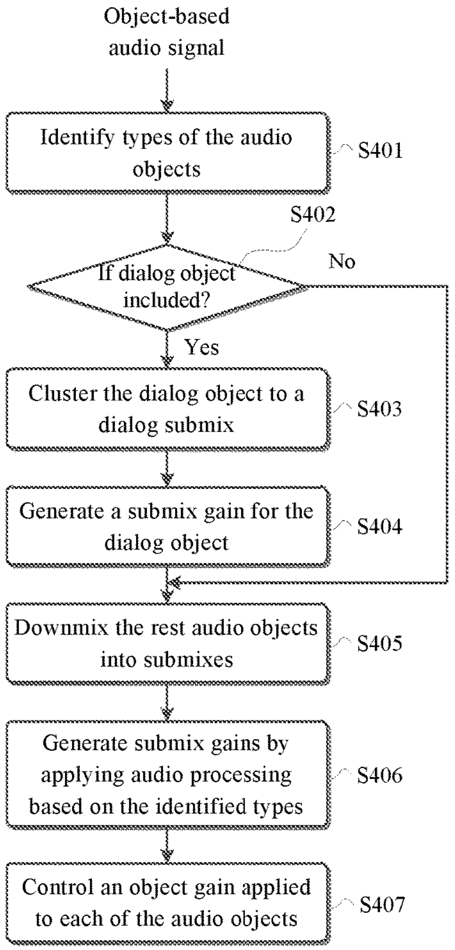
FIG. 4 illustrates a flowchart of a method of processing an object-based audio signal in accordance with another example embodiment.

With reference to FIG. 4, a more sophisticated flow chart 400 is illustrated involving creating dialog submix(es) and analyzing object type(s).

In one example embodiment disclosed herein, at step S401, the types of the audio objects may be identified. Automatic classification technologies can be used to identify audio types of the signal being processed to generate the dialog submix. Existing methods such as the one noted in U.S. Patent Application No. 61/811,062 may be used for audio type identification, and its entirety is incorporated herein by way of reference.

In another embodiment, if the automatic classification is not provided but manual labels on types, especially the type of dialog, of the audio objects are available, an additional dialog (D) submix, representing content rather than spatial attributes, can be also generated. Dialog submixes are useful when human voices such as narration are meant to be processed independently of other audio objects.

To achieve this, whether the input object-based audio signal include dialog object(s) need to be determined at step S402. In dialog submix generation, an object can be exclusively assigned to the dialog submix, or partially (with a weight) downmixed to the dialog submix. For example, an audio classification algorithm usually outputs a confidence score (in [0, 1]) with regard to its decision on the presence of dialog. This confidence score can be used to estimate a reasonable weight for the object. Thus, the C/F/S/H/D submixes can be generated by using the following panning coefficients.

$$\alpha_{id} = c_i^2 \quad (8)$$

$$\alpha_{ij}' = (1 - c_i^2) \cdot \alpha_{ij} \quad (9)$$

where $c_i$ represents the weight panning to dialog submix, which can be derived from the dialog confidence of the audio object (or directly equal to the dialog confidence score), $\alpha_{id}$ represents the panning coefficient for the i-th object in relation to a dialog zone, $\alpha_{ij}'$ represents the modified panning coefficient to other submixes by considering the dialog confidence score, and j represents the four zones c, f, s, h as defined previously.

In these two Equations (8) and (9), $c_i^2$ is used in order for energy preservation, and $\alpha_{ij}$ is calculated in the same way as Equations (1) to (4). If one or more audio objects are determined as dialog object(s), the dialog object(s) may be clustered to a dialog submix at step S403.

With the obtained dialog submix, dialog enhancement can work on clean dialog signals instead of mixed signals (dialog with background music or noise). Another benefit it brings is that dialog at different positions can be enhanced simultaneously, while conventional dialog enhancement may only boost the dialogs in the center channel.

In some cases, if the same computational complexity as those with four submixes is to be maintained when the dialog submix is involved, four "enhanced" submixes can be generated from five C/F/S/H/D submixes. One possible way is that D can be used to replace C while merging original C and F together, and thus four submixes are generated: D (in C), C+F, S, and H. In this case, all the dialogs are "intentionally" put to the center submix since conventional dialog enhancement assumes human voices to be reproduced by the center channel, while the non-dialog objects which would have been panned into the center submix are panned into the front submix. The above processes work smoothly with existing audio processing algorithms.

At step S404, a submix gain may be generated for the dialog object(s) by applying some particular processing algorithms with regard to dialog, in order to represent a preferred weighting of the particular dialog submix. Then at step S405, the rest audio objects may be downmixed into submixes, which is similar to the steps S101 and S102 described above.

As the object type may have been identified at the step S401, the identified type can be used, at step S406, to automatically steer the behavior of audio processing algorithms by estimating their most suitable parameters based on the identified type, as the system presented in the U.S. Patent Application No. 61/811,062. For example, the amount of intelligent equalizer may be set to close to 1 for music signal, and set it to close to 0 for speech signal.

Finally, at step S407, object gains applied to each of the audio objects may be controlled in a similar way compared with the step S104.

It is to be noted that the steps from S403 to S406 are not necessarily sorted in sequence. The dialog object(s) and the other object(s) may be processed simultaneously so that the resulting submix gains for all of the objects are generated at the same time. In another example, the submix gain for the dialog object(s) may be generated after the submix gains for the rest object(s) are generated.

With the object-based audio signal processing processes in accordance with the example embodiments described herein, the objects can be rendered more accurately. In addition, even the dialog submix is about to be utilized, the computational complexity would not be increased compared with the case with only F/C/S/H submixes.

Figure 5:
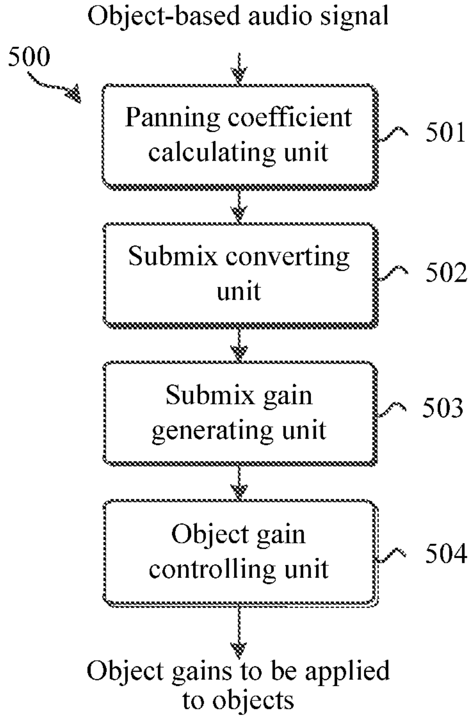
FIG. 5 illustrates a system for processing an object-based audio signal in accordance with an example embodiment.

FIG. 5 illustrates a system 500 for processing an audio signal having a plurality of audio objects in accordance with an example embodiment described herein. As shown, the system 500 comprises a panning coefficient calculating unit 501 configured to calculate a panning coefficient for each of the audio objects in relation to each of a plurality of predefined channel coverage zones based on spatial metadata of the audio object. The system 500 also comprises a submix converting unit 502 configured to convert the audio signal into submixes in relation to all of the predefined channel coverage zones based on the calculated panning coefficients and the audio objects. The predefined channel coverage zones are defined by a plurality of endpoints distributed in a sound field. Each of the submixes indicates a sum of components of the plurality of the audio objects in relation to one of the predefined channel coverage zones. The system 500 further comprises a submix gain generating unit 503 configured to generate a submix gain by applying an audio processing to each of the submixes, and an object gain controlling unit 504 configured to control an object gain applied to each of the audio objects, the object gain being as a function of the panning coefficients for each of the audio objects and the submix gains in relation to each of the predefined channel coverage zones.

In some example embodiments, the system 500 may comprise an audio signal rendering unit configured to render the audio signal based on the audio objects and the object gain.

In some other example embodiments, each of the submixes may be converted as a weighted average of the plurality of audio objects, with the weight being the panning coefficient for each of the audio objects.

In another example embodiment, the number of the predefined channel coverage zones may be equal to the number of the converted submixes.

In yet another example embodiment, the system 500 may further comprises a dialog determining unit configured to determine whether the audio object belongs to a dialog object, and a dialog object clustering unit configured to cluster the audio object to a dialog submix in response to the audio object being determined to be a dialog object. In some example embodiments disclosed herein, whether the audio object belongs to a dialog object may be estimated by a confidence score, and the system 500 may further comprises a dialog submix gain generating unit configured to generate the submix gain for the dialog submix based on the estimated confidence score.

In some other example embodiments, the predefined channel coverage zones may comprise a front zone defined by a front left channel and a front right channel, a center zone defined by a center channel, a surround zone defined by a surround left channel and a surround right channel, and a height zone defined by a height channel. In some other embodiments, the system 500 further comprises a front submix converting unit configured to convert the audio signal into a front submix in relation to the front zone based on the panning coefficients for the audio objects; a center submix converting unit configured to convert the audio signal into a center submix in relation to the center zone based on the panning coefficients for the audio objects; a surround submix converting unit configured to convert the audio signal into a surround submix in relation to the surround zone based on the panning coefficients for the audio objects; and a height submix converting unit configured to convert the audio signal into a height submix in relation to the height zone based on the panning coefficients for the audio objects. Yet in another example embodiment, the system 500 further comprises a merging unit configured to merge the center submix and the front submix, and a replacing unit configured to replace the center submix by the dialog submix. Still in another example embodiment, the surround submix and the height submix may be applied with a same audio processing algorithm in order to generate the corresponding submix gains.

In some other example embodiments, the system 500 may further comprises an object type identifying unit configured, for each of the audio objects, to identify a type of the audio object, and the submix gain generating unit is configured to generate the submix gain by applying an audio processing to each of the submixes based on the identified type of the audio object.

For the sake of clarity, some optional components of the system 500 are not shown in FIG. 5. However, it should be appreciated that the features as described above with reference to FIGS. 1-4 are all applicable to the system 500. Moreover, the components of the system 500 may be a hardware module or a software unit module. For example, in some embodiments, the system 500 may be implemented partially or completely with software and/or firmware, for example, implemented as a computer program product embodied in a computer readable medium. Alternatively or additionally, the system 500 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 6:
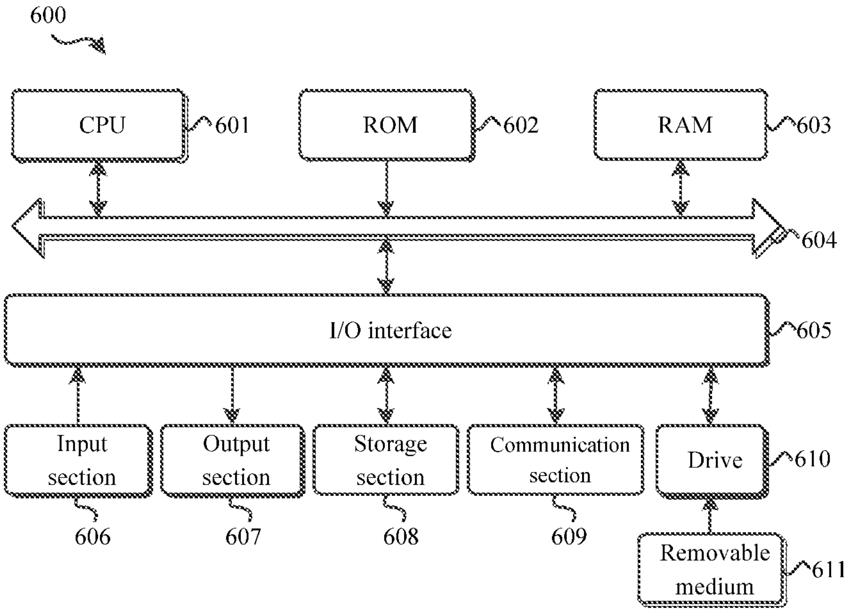
FIG. 6 illustrates a block diagram of an example computer system suitable for the implementing example embodiments disclosed herein.

FIG. 6 shows a block diagram of an example computer system 600 suitable for implementing example embodiments disclosed herein. As shown, the computer system 600 comprises a central processing unit (CPU) 601 which is capable of performing various processes in accordance with a program stored in a read only memory (ROM) 602 or a program loaded from a storage section 608 to a random access memory (RAM) 603. In the RAM 603, data required when the CPU 601 performs the various processes or the like is also stored as required. The CPU 601, the ROM 602 and the RAM 603 are connected to one another via a bus 604. An input/output (I/O) interface 605 is also connected to the bus 604.

The following components are connected to the I/O interface 605: an input section 606 including a keyboard, a mouse, or the like; an output section 607 including a display, such as a cathode ray tube (CRT), a liquid crystal display (LCD), or the like, and a speaker or the like; the storage section 608 including a hard disk or the like; and a communication section 609 including a network interface card such as a LAN card, a modem, or the like. The communication section 609 performs a communication process via the network such as the internet. A drive 610 is also connected to the I/O interface 605 as required. A removable medium 611, such as a magnetic disk, an optical disk, a magneto-optical disk, a semiconductor memory, or the like, is mounted on the drive 610 as required, so that a computer program read therefrom is installed into the storage section 608 as required.

Specifically, in accordance with the example embodiments disclosed herein, the processes described above with reference to FIGS. 1-4 may be implemented as computer software programs. For example, example embodiments disclosed herein comprise a computer program product including a computer program tangibly embodied on a machine readable medium, the computer program including program code for performing methods 100 and/or 300. In such embodiments, the computer program may be downloaded and mounted from the network via the communication section 609, and/or installed from the removable medium 611.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other example embodiments set forth herein will come to mind of one skilled in the art to which these embodiments pertain to having the benefit of the teachings presented in the foregoing descriptions and the drawings.

Accordingly, the example embodiments disclosed herein may be embodied in any of the forms described herein. For example, the following enumerated example embodiments (EEEs) describe some structures, features, and functionalities of some aspects of the present invention.

EEE 1. A method of object audio processing system, including:
- An object submixer that renders/downmixes audio objects into submixes based on the object's spatial metadata;
- An audio processor that processes the generated submixes;
- A gain applier that applies the gains obtained from audio processer to original audio objects.

EEE 2. The method in EEE 1, wherein the object submix generates four submixes: Center, Front, Surround and Height, and each submix is generated as a weighted average of the audio objects, with the weight being the panning gain of each object in each submix.

EEE 3. The method in EEE 1, wherein the object submix further generates a dialog submix based on the manual label or automatic audio classification, and the detailed computation is illustrated in Equations (8) and (9).

EEE 4. The method in EEEs 2 and 3, the object submixer generates four "enhanced" submixes from five C/F/S/H/D submixes, by replacing C by D and merging original C and F together.

EEE 5. The method in EEE 1, the audio processer processes the Height submix by using the same method processing the Surround submix.

EEE 6. The method in EEE 1, the audio processer directly uses the dialog submix for dialog enhancement.

EEE 7. The method in EEE 1, wherein the gain of each audio object is computed from the gain obtained for each submix and the panning gain of the object in each submix, as illustrated in Equation (7).

EEE 8. The method in EEE 1, wherein a content identification module can be added for automatic content type identification and automatic steering of audio processing algorithms.

What is claimed is:

1. A method of processing an audio signal, the audio signal having a plurality of audio objects, the method comprising: receiving the plurality of audio objects associated with a spatial metadata; converting the audio signal into a plurality of submixes, wherein each submix corresponds to a subset of the plurality of audio objects of the audio signal, wherein each submix includes rendering constraints regarding locations of the subset of the plurality of audio objects; determining a corresponding submix gain for each submix; and rendering the plurality of submixes based on the rendering constraints, the spatial metadata, and submix gains.

2. The method according to claim 1, further comprising determining a weighted average of the plurality of audio objects for each submix.

3. The method according to claim 2, further comprising determining a weight corresponding to each submix based on the weighted average, wherein the weight relates to a panning coefficient for each of the corresponding audio objects of each submix.

4. The method according to claim 3, wherein converting the audio signal into the plurality of submixes further comprises one or more of:
- converting the audio signal into a front submix in relation to a front zone based on panning coefficients for the audio objects;
- converting the audio signal into a center submix in relation to a center zone based on the panning coefficients for the audio objects;
- converting the audio signal into a surround submix in relation to a surround zone based on the panning coefficients for the audio objects; and
- converting the audio signal into a height submix in relation to a height zone based on the panning coefficients for the audio objects.

5. The method according to claim 1, further comprising:
- for each of the audio objects, identifying a type of the audio object; and
- generating the submix gains by applying an audio processing to the plurality of submixes based on the identified type of the audio object.

6. A non-transitory computer readable medium storing a computer program that, when executed by a processor, controls an apparatus to execute processing including the method of claim 1.

7. A system for processing an audio signal, the audio signal having a plurality of audio objects, the system comprising:
- a receiver for receiving the plurality of audio objects associated with a spatial metadata;
- a converter for converting the audio signal into a plurality of submixes, wherein each submix corresponds to a subset of the plurality of audio objects, wherein each submix includes rendering constraints regarding locations of the subset of the plurality of audio objects;
- a processor for determining a corresponding submix gain for each submix; and
- a renderer for rendering the plurality of submixes based on the rendering constraints, the spatial metadata, and submix gains.

* * * * *